United States Patent [19]

Hogan et al.

[11] Patent Number: 5,063,346
[45] Date of Patent: Nov. 5, 1991

[54] WHEEL SPEED SENSOR FOR REMOTE INSTALLATION

[75] Inventors: Martin J. Hogan, Sandusky, Ohio; Martin A. Hogan, Farmington Hills, Mich.

[73] Assignee: General Motors Corporation, Detroit, Mich.

[21] Appl. No.: 542,614

[22] Filed: Jun. 25, 1990

[51] Int. Cl.⁵ .......................... G01P 3/44; F16C 32/00
[52] U.S. Cl. ............................... 324/173; 324/207.22; 384/448
[58] Field of Search .............. 324/160, 166, 173, 174, 324/207.22, 207.25; 384/446, 448; 180/170; 188/181 R; 73/518, 519

[56] References Cited

U.S. PATENT DOCUMENTS

| 3,683,219 | 8/1972 | Kruse | 310/168 |
| 4,869,604 | 9/1989 | Hill et al. | 384/569 |
| 4,940,936 | 7/1990 | Grillo et al. | 324/174 |

Primary Examiner—Gerard R. Strecker
Attorney, Agent, or Firm—Patrick M. Griffin

[57] ABSTRACT

A sensor assembly for installation between an axle shaft and axle tube includes a roller bearing held coaxially to a sensor ring by a clutch member that is released when the shaft is turned after installation.

3 Claims, 2 Drawing Sheets

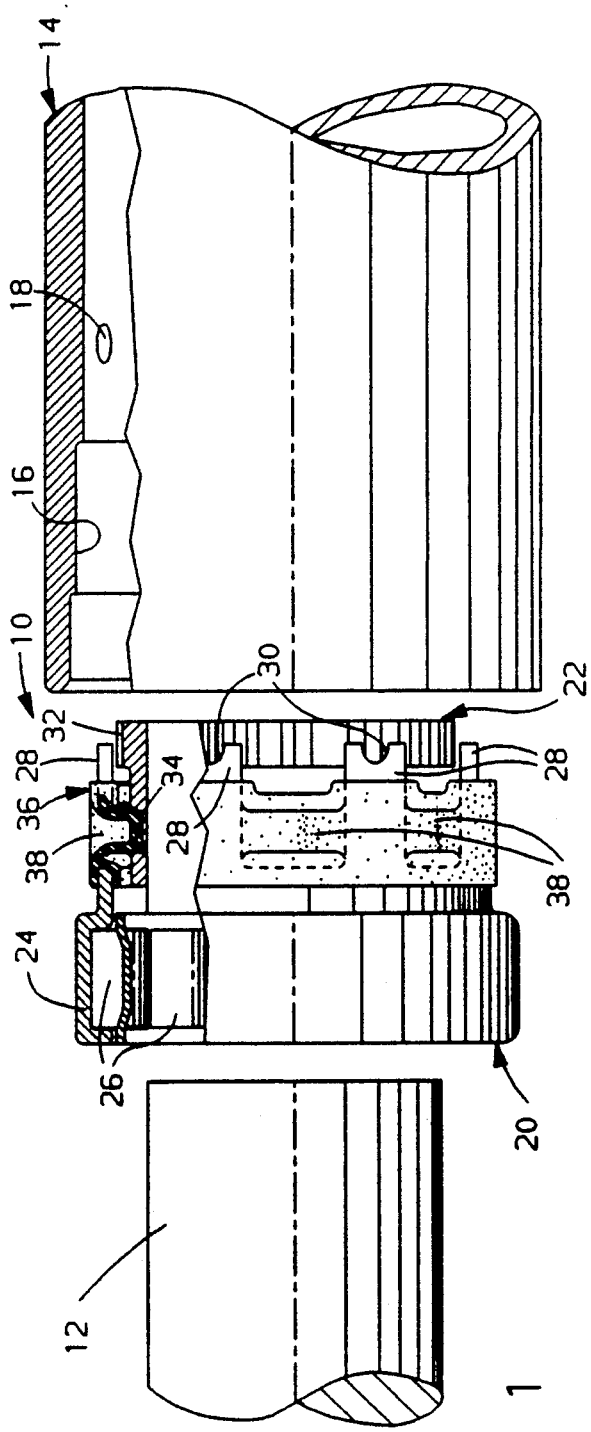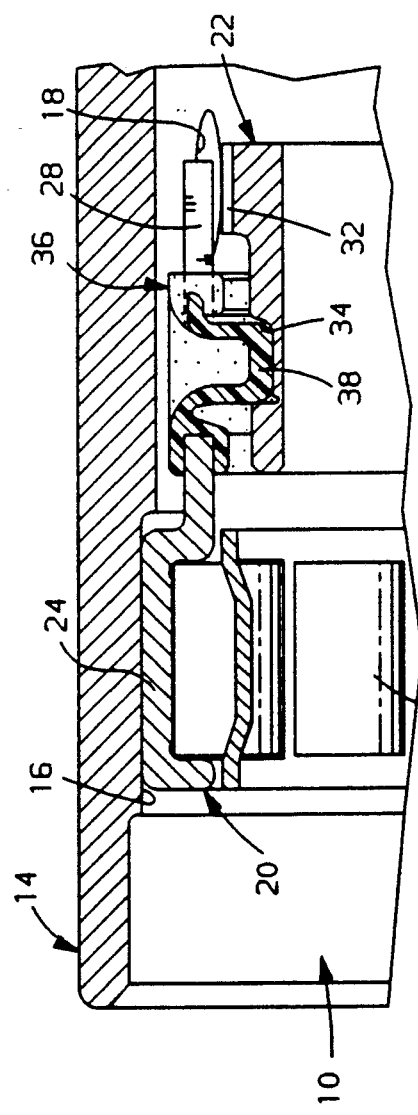
FIG. 1
FIG. 2

WHEEL SPEED SENSOR FOR REMOTE INSTALLATION

This invention relates to vehicle wheel sensors in general, and specifically to a speed sensor assembly adapted for easy installation.

BACKGROUND OF THE INVENTION

With increasing interest in antilock braking systems, there has been a concurrent interest in wheel speed sensor assemblies. Such assemblies typically incorporate a sensor ring that turns at wheel speed, and a stationary sensor that faces the sensor ring. In the case of wheel bearings that have a large sealed interior volume, it is a simple matter to mount the sensor components in that existing space. This is especially true for non-driven vehicle wheels, which have no axle shaft passing through the center of their bearings, and which can thus be sealed on one side with a cap. The bearing cap provides a large, easily accessed space in which to mount the sensor components. An example of such a design may be seen in FIG. 1 of Kruse U.S. Pat. No. 3,683,219.

In the case of driven wheels, such as those in conventional rear drive vehicles, axle shafts extend in either direction from a differential, through a stationary axle tube and eventually through bearings that support the axle shaft within the axle tube. A long, thin volume is thereby created between the shaft and tube. The rear wheels are mounted to the ends of the axle shafts. Since the axle shaft rotates at vehicle wheel speed, it is a logical place to mount the sensor ring. Likewise, since the axle tube is stationary, it provides a solid foundation for the sensor. However, the thin annular space is not nearly so accessible for the installation of the sensor components as is the end cap found on non-driven wheel bearings. FIG. 2 of the patent noted above shows a sensor assembly in such an annular space, but is notably silent as to how it would be installed.

SUMMARY OF THE INVENTION

The invention provides a speed sensor assembly specially designed for installation in such a difficult access volume.

A preferred embodiment of the invention is incorporated in a roller bearing that supports an axle shaft for rotation within an axle tube in a conventional rear wheel drive system. The roller bearing has an outer race that press fits tightly inside the axle tube. The outer race also has a cylindrical extension with a diameter that locates it about midway between the shaft and tube. An annular sensor ring has an inner surface diameter that allows it to be closely press fit over the outside of the shaft, and an outer surface that includes a conventional array of magnetic teeth. Axially inboard of the teeth, a series of six evenly spaced camming slots are cut into the outer surface of the sensor ring. The radial depth of each camming slot is predetermined relative to another structure, which retains the bearing race and sensor ring together temporarily as a unitized assembly.

The bearing race extension also has a series of six evenly spaced windows, which overlay the sensor ring camming slots. A layer of flexible, but reasonably stiff, plastic material is molded over and through the windows so as to form six evenly spaced identical detects, each of which is generally U-shaped in cross section. The detents have a concave stable position in which each protrudes radially into a respective camming slot. Since the detents form three diametrically opposed pairs, they maintain the sensor ring centered and coaxial to the bearing race. The forces experienced during normal shipping and handling are not strong enough to shift the detents radially, or to bend them significantly axially, so the sensor ring and bearing are kept securely together as a unitized assembly. The detents are also sufficiently axially stiff to resist the force of the axle shaft passing through the sensor ring. Therefore, the bearing race is the only part that has to be directly installed, since it serves as an installation carrier for the whole assembly.

After installation, when the axle is turned, the camming slots push the detents radially out by an amount equivalent to their depth. That amount is sufficient to shift the detents radially out, in overcenter fashion, to a convex stable position where they clear the camming slots. The sensor ring can then turn freely with the axle shaft and wheel, and a sensor can be installed through the axle tube to read the sensor ring teeth. The detents thus act as a one time clutch member, holding the sensor ring and bearing race together for shipping and installation purposes, but freeing them for later operation.

It is, therefore, a general object of the invention to provide a speed sensor assembly that can be easily installed between a rotatable shaft and a stationary housing surrounding the shaft.

It is another object of the invention to provide such an assembly by retaining a shaft mounted sensor ring to a tube mounted bearing race by an overcenter clutch member that will free the sensor ring from the bearing race after installation.

It is still another object of the invention to retain the sensor ring to a bearing race by a series of overcenter clutch fingers that form diametrically opposed pairs, and which extend radially into camming slots in the sensor ring, thereby maintaining the bearing and sensor ring in coaxial relation for easy installation.

DESCRIPTION OF THE PREFERRED EMBODIMENT

These and other objects and features of the invention will appear from the following written description, and from the drawings, in which:

FIG. 1 is a view of the end of an axle shaft, an axle tube, and a preferred embodiment of the invention axially aligned before installation;

FIG. 2 is a view of the assembly of the invention installed in the axle tube, before the insertion of the axle shaft;

Figure 3:
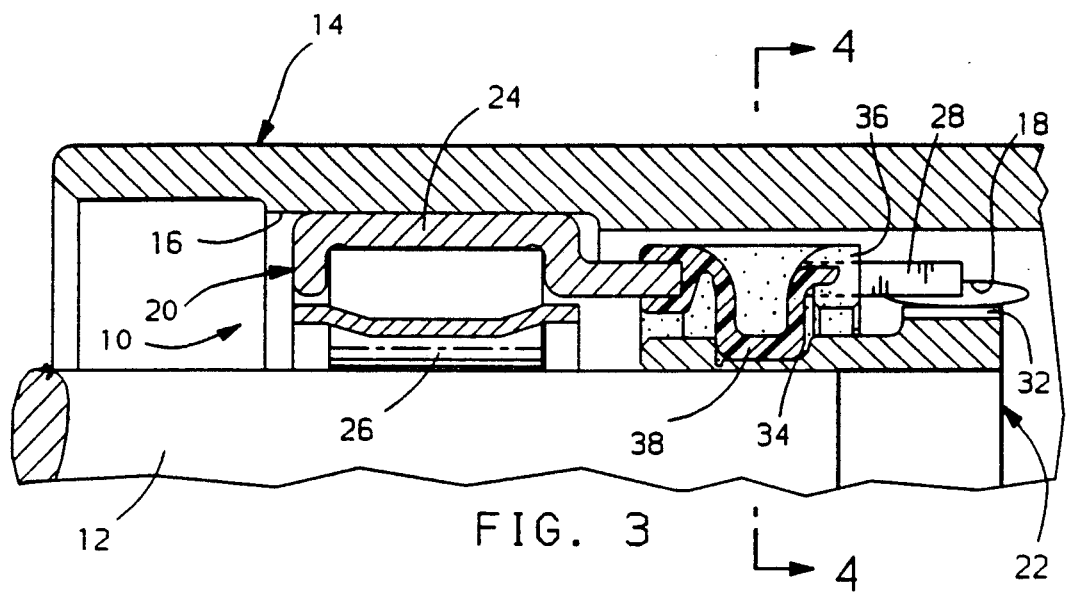
FIG. 3 is a view like FIG. 2, showing the axle shaft being inserted.

Referring first to FIG. 1, a preferred embodiment of the invention, indicated generally at 10, is designed to be installed between an axle shaft 12, and an axle tube indicated generally at 14. In a conventional rear drive configuration, an axle tube like 14 would extend out from each side of a differential. A driven shaft like 12 would be rotatably supported centrally within each tube 14, with a wheel bolted to a flange at the end of shaft 12. A long, thin annular space is thereby created between the outer surface of shaft 12 and the inner surface of axle tube 14 surrounding the central axis of shaft 12, which is indicated by the dotted line. While the entire inner surface of axle tube 14 is basically cylindrical, one portion of it near the end is turned down so as to be rigorously cylindrical, indicated at 16. A hole 18 is drilled through the wall of axle tube 14 axially inboard of cylindrical portion 16.

Figure 4:
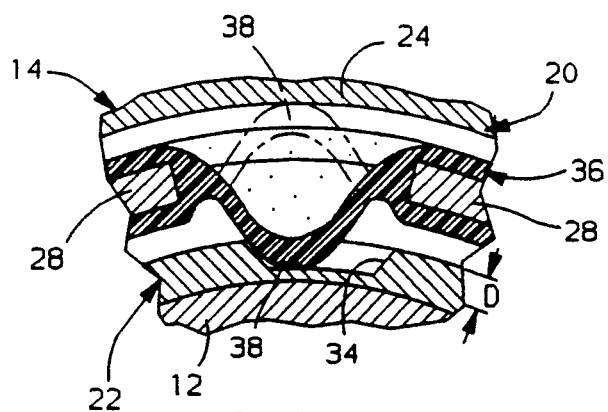
FIG. 4 is a cross sectional view taken along the line 4—4 of FIG. 3, before the detents are shifted.

Referring next to FIGS. 1 and 4, speed sensor assembly 10 includes two main components, a roller bearing, indicated generally at 20, and a sensor ring, indicated generally at 22. Roller bearing 20 includes a cylindrical stamped steel outer race 24 with an outer diameter that allows it to be firmly press fitted into axle tube cylindrical portion 16. A caged complement of rollers 26 are arrayed at the proper diameter to ride directly on shaft 12, supporting it coaxially within tube 14. Outer race 24 is stamped with a cylindrical extension comprised of a series of six evenly spaced, axially extending beams 28, each of which resides at a diameter that places it nearer to the inner surface of axle tube 14 than to shaft 12, but radially clear of both. The beams 28 in effect create six evenly spaced gaps or windows between them. The end of each beam 28 is cut with a semicircular edge 30, for a purpose described below. Sensor ring 22 is an annular ferrous metal part with an inner surface diameter substantially identical to shaft 12's outer surface. Ring 22's outer surface includes a circular array of teeth 32, which have a diameter that gives them radial clearance from the beams 28. Cut into the outer surface of ring 22 inboard of teeth 32 are six evenly spaced camming slots 34, each of which has a radial depth D, and a circumferential width just less than the spacing between the beams 28. Therefore, the ring 22 and beams 28 can be aligned such that each camming slot 34 is located between a pair of beams 28.

Still referring next to FIGS. 1 and 4, assembly 10 is completed by an overcenter clutch member which, in the embodiment disclosed, is made up of a band of plastic material 36 molded around the circumference of all the beams 28 and inset down between them to form six evenly spaced detents 38. Each detent 38 is of identical width and depth, and generally U-shaped in cross section. Each detent 38 extends radially inwardly far enough that the bight of the U enters, and touches the bottom surface of, a respective camming slot 34. If the detents 38 remain in the convex configuration shown in FIG. 4, then sensor ring 22 is maintained substantially coaxial to bearing race 24, since the diametrically opposed pairs of detents 38 will prevent ring 22 from shifting significantly in the radial direction. While the plastic material 36 from which the detents 38 are formed has some inherent resilience and flexibility, it is stiff enough in the radial direction that the FIG. 4 configuration is stable, at least when subjected to the kind of disturbing forces seen during normal shipping and handling. Likewise, the plastic material 36 is stiff enough that the detents 38 are in turn stiff enough in the axial direction to resist being pulled axially out of the camming slots 34, either by normal handling forces or by the frictional force experienced when shaft 12 is pushed through ring 22. Ring 22 and bearing 20 are thus retained securely together as a rattle free, unit handled assembly 10, which can be easily installed, as described next.

Referring next to FIGS. 2 through 4, assembly 10 is installed by first pressing bearing race 24 firmly into axle tube cylindrical portion 16. Race 24 is circumferentially aligned with tube 14 before insertion so that one beam edge 30 will register with tube shaft hole 18. Next, shaft 12 can be inserted through the rollers 26 and through the coaxial sensor ring 22. The detents 38, as noted, are stiff enough to keep sensor ring 22 from pulling off as shaft 12 passes through. Consequently, assembly 10 could also be installed by pushing it into the annular space between shaft 12 and axle tube 14 in a situation where shaft 12 already was supported inside axle tube 14. Because sensor ring 22 is retained to bearing 20 as a unit, there are no more steps needed to install assembly 10 than would be needed to install a conventional roller bearing. Bearing race 24, in effect, serves as a carrier or mounting sleeve with which to install sensor ring 22. After installation, a conventional sensor probe, not illustrated, would be secured through hole 18 and through edge 30 to face teeth 32. Edge 30 is capable of providing extra support to such a probe. A conventional seal, not illustrated, would be pushed into the end of tube 14 outboard of bearing 20.

Figure 5:
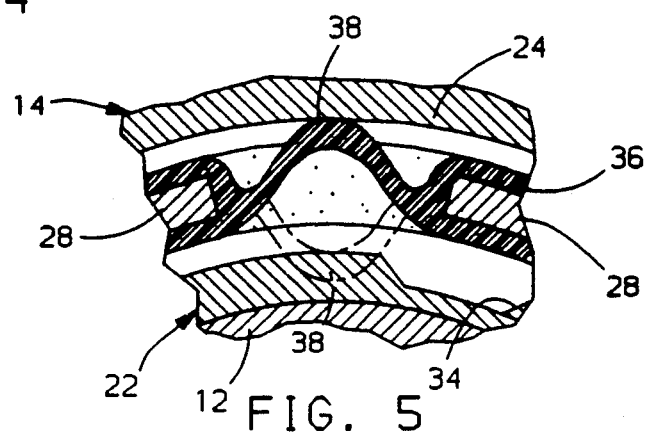
FIG. 5 is a view like 4, after the detents are shifted out to free the sensor ring.

Referring next to FIGS. 4 and 5, the final step in making sensor ring 22 operative is illustrated. Before wheel speed can be sensed, sensor ring 22 must be freed from bearing race 24 so that it can register the speed of shaft 12 without interference. However, sensor ring 22 is no longer easily accessible. Shaft 12 can be easily turned, however, and will inevitably turn when the wheel turns. This is used to advantage. While the concave position of the detents 38 is stable, their shape is such that they will overcenter and shift radially out to the FIG. 5 position if they are forced radially out by the amount D, which is the defined depth of the camming slots 34. During shipping, the detents 38 do not see that degree of radial force, but they do when shaft 12 and sensor ring 22 turn. As illustrated in FIG. 5, turning the camming slots 34 causes the detents 38 to pop out to a convex stable position, clear of sensor ring 22.

Variations from the disclosed embodiment could be made. The clutch member could be made part of a separate mounting sleeve in a situation where there was not a bearing located outboard of the desired location of the sensor ring, or where it was not convenient to provide a cylindrical extension on the bearing race. Such a mounting sleeve would be installed as the bearing race 24 is, with the sensor ring 22 retained releasably to it in similar fashion. It is a great advantage to combine the bearing race 24 and sensor ring 22, however, so as to consolidate both parts and process steps. Other twist releasable clutch members could be used to temporarily retain the sensor ring 22 to bearing 20, such as individual spring fingers stamped out of the extension of the bearing race 24. The camming slots 34 need not be relieved areas as such, but could consist of projections raised above the surface of sensor ring 22 by the amount D, so the term camming slot should be considered more broadly. Fewer clutch fingers than six could be used if the only objective were to just retain sensor ring 22 against axial pull away from the bearing. However, the use of diametrically opposed pairs of clutching fingers like detents 38 is highly advantageous in that it retains the sensor ring 22 in a coaxial, installation ready orientation. Therefore, it will be understood that the invention is not intended to be limited to just the embodiment disclosed.

The embodiments of the invention in which an exclusive property or privilege is claimed are defined as follows:

1. A speed sensor assembly adapted to be installed between a stationary housing having a cylindrical inner surface and a rotatable shaft disposed coaxially within said housing surface, comprising, a generally cylindrical sensor ring having an interior surface sized to press fit non-turnably over said shaft and an exterior surface including a camming slot having a predetermined radial depth, a generally cylindrical mounting sleeve sized to press fit non-turnably within said housing cylindrical surface, and, an overcenter clutch member carried by said mounting sleeve which is shiftable from a first stable position in which it protrudes into said camming slot to a second stable position in which it rests clear of said slot when radially forced from said first stable position by said predetermined amount, said clutch member further being substantially inflexible in the axial direction, whereby said sensor ring and mounting sleeve are retained together by said clutch member as a unit that can be installed by pushing said mounting sleeve into said housing cylindrical surface and by pushing said sensor ring over said shaft, by virtue of the axial inflexibility of said clutch member, after which said sensor ring may be freed from said mounting sleeve by turning said shaft and sensor ring, thereby forcing said camming slot into said clutch member and shifting it radially to said second stable position.

2. A speed sensor assembly adapted to be installed between a stationary housing having a cylindrical inner surface and a rotatable shaft disposed coaxially within said housing surface, comprising, a generally cylindrical sensor ring having an interior surface sized to press fit non-turnably over said shaft and an exterior surface including a camming slot having a predetermined radial depth, a rolling element bearing having a generally cylindrical bearing race sized to press fit non-turnably within said housing cylindrical surface and thereby rotatably support said shaft within said housing, and, an overcenter clutch member carried by said bearing race which is shiftable from a first stable position in which it protrudes into said camming slot to a second stable position in which it rests clear of said slot when radially forced from said first stable position by said predetermined amount, said clutch member further being substantially inflexible in the axial direction, whereby said sensor ring and bearing are retained together by said clutch member as a unit that can be installed by pushing said bearing race into said housing cylindrical surface and by pushing said sensor ring over said shaft, by virtue of the axial inflexibility of said clutch member, after which said sensor ring may be freed from said bearing race by turning said shaft and sensor ring, thereby forcing said camming slot into said clutch member and shifting it radially to said second stable position.

3. A speed sensor assembly adapted to be installed between a stationary housing having a cylindrical inner surface and a rotatable shaft disposed coaxially within said housing surface, comprising, a generally cylindrical sensor ring having an interior surface sized to press fit non-turnably over said shaft and an exterior surface including at least a pair of substantially diametrically opposed camming slots having a predetermined radial depth, a generally cylindrical mounting sleeve having a larger diameter portion sized to press fit non-turnably within said housing cylindrical surface and a smaller diameter portion extending axially over said sensor ring camming slot, a pair of substantially diametrically opposed overcenter clutch fingers extending radially from said mounting sleeve smaller diameter portion, each of which is shiftable from a first stable position in which it protrudes into said camming slot to a second stable position in which it rests clear of said slot when radially forced from said first stable position by said predetermined amount, said clutch fingers further being substantially inflexible in the axial direction, whereby said sensor ring and mounting sleeve are retained together in substantially coaxial relation by said clutch fingers as a unit that can be installed by pushing said larger diameter mounting sleeve portion into said housing cylindrical surface and by pushing said sensor ring over said shaft, by virtue of the axial inflexibility of said clutch fingers, after which said sensor ring may be freed from said mounting sleeve by turning said shaft and sensor ring, thereby forcing said camming slots into said clutch fingers and shifting them radially to said second stable position.

* * * * *